June 25, 1935.　　　　　J. J. MOREY　　　　2,006,217
OPTICAL SYSTEM FOR PHOTOGRAPHIC SOUND APPARATUS
Original Filed Feb. 10, 1932
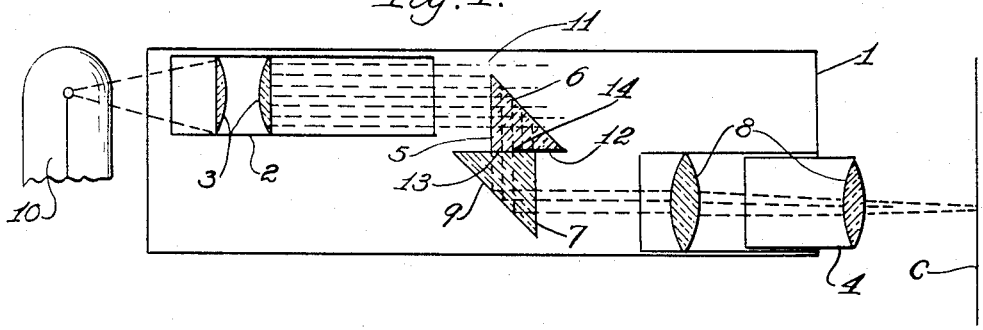
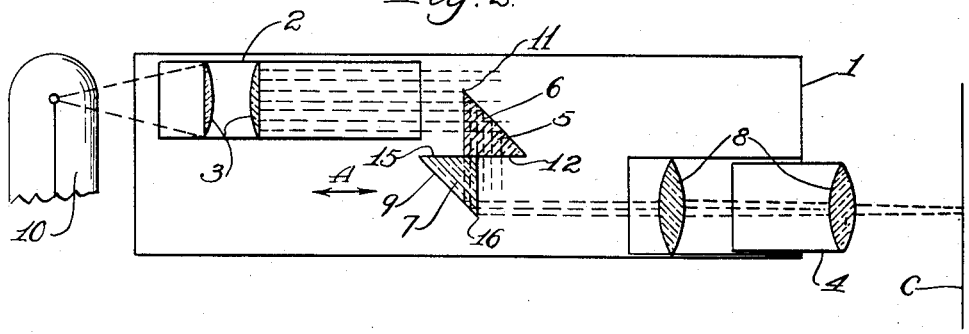
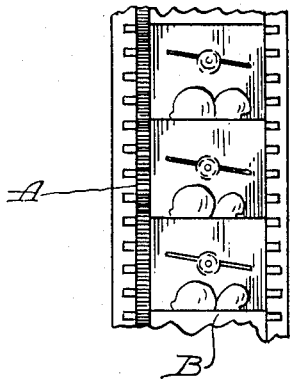
Inventor.
James J. Morey.
by his Attorneys
Witness Patented June 25, 1935

2,006,217

UNITED STATES PATENT OFFICE 2,006,217

OPTICAL SYSTEM FOR PHOTOGRAPHIC SOUND APPARATUS

James J. Morey, Chicago, Ill., assignor to Lennie L. Morey, Portland, Oreg.

Application February 10, 1932, Serial No. 591,937
Renewed December 4, 1934

4 Claims. (Cl. 88—24)

This invention relates to apparatus for recording sound by means of a photographic record of the type frequently employed in conjunction with motion pictures, which consists in a series of successive narrow rectangular areas of graduated density, forming a so-called sound track which is usually disposed on the motion picture film at one side of the areas forming the successive "frames" of the picture. The object of the present invention is to provide optical means for forming into a narrow beam of rectangular cross-section the light which is employed for producing the photographic record of the sound waves. It consists of a combination of certain elements herein shown and described, and as indicated in the claims.

In the drawing:

Figure 1 is a somewhat diagrammatic representation of an optical system embodying this invention, showing the containing tube and the various elements of the system in section at a plane substantially axial with respect to said tube.

Figure 2 is a similar diagrammatic view representing a slight modification.

Figure 3 is a face view of a fragment of motion picture film which includes a sound track produced in accordance with this invention.

As will be readily understood by those skilled in the art, the sound track, A, represented on the film, B, in Figure 3, consists of successive narrow areas of black or gray tone, varying in density in accordance with variations in the sound waves, of which such a record is made. The sound waves acting upon a microphone or similar instrument are super-imposed upon the electrical waves of an alternating current, and an electric lamp is provided with an energizing current whose strength is controlled or varied by fluctuations in the microphone current produced by the sound waves affecting it. This light of varying intensity is focused upon the narrow longitudinal area of the photographic film known as the sound track. To confine the focused light to a small and definite narrow area it is customarily transmitted through a mask or screen, having a slit of the desired proportions, and the present optical system is designed to perform the functions of such a slit in an improved manner.

As shown in Figure 1, the various elements are mounted in a supporting tube, 1, which may have fixed within it at one end a carrying tube, 2, for a condenser lens system of any standard type, represented herein by the lenses, 3. The tube, 2, extends from said lenses toward the vertical face of a right triangular prism, 5, whose inclined hypotenuse, 6, serves as a reflector for deflecting the entering light at right angles to its original direction, and transversely into a second right triangular prism, 7. Opposite the vertical face of said prism, 7, is a second carrying tube, 4, in which the system of focusing lenses, 8, is mounted. For purposes of illustration these lenses, 8, are shown as two in number, but it will be understood that any suitable series of lenses may be employed at this point.

From the lamp indicated diagrammatically at 10, the rays of light are collected by the condenser lenses, 3, and propagated to the prism, 5. Preferably, to insure a high degree of efficiency, I employ quartz prisms at 5 and 7, and the lenses at 3 and 8 should also be made of this material. The inclined surface, 6, need not be silvered or even coated with an opaque backing, but will act efficiently as a reflecting surface from which the rays of light are transmitted toward the inclined face, 9, of the prism, 7, and from this surface the light is transmitted forwardly through the focusing lenses, 8.

As shown in Figure 1, the prism, 5, is mounted so that its upper edge, 11, at the intersection of its vertical surface and its hypotenuse, 6, is positioned in the field of light emanating from the condenser lenses, 3, and defines one edge of the reflection picked up by the oblique surface, 9, of the prism, 7. The opposite edge of the reflection may be determined by coating the horizontal face, 12, of the prism, 5, with opaque material, leaving only a partial area, 13, of this face exposed for the transmission of light to the other prism, 7. The edge, 14, of this opaque coating will thus define the other side of the reflection transmitted from the surface, 9, into the focusing lenses at 8.

Or, as shown in Figure 2, the prisms, 5 and 7, may be offset to such an extent in the substantially common plane of their horizontal surfaces, 12 and 15, respectively, that only a portion of the beam reflected from the surface, 6, will enter the prism, 7, and only the portion which does enter this prism will be reflected from the lower part of its inclined surface, 9, and thence forwardly into the focusing lenses, 8. Thus the lower edge, 16, of the prism, 9, will define one edge of the reflection which is transmitted from the surface, 9, into the focusing lens system. By mounting the prisms, or one of them, for adjustment parallel to their adjacent faces, 12 and 15 (as indicated by the arrow, A, on Figure 2), I provide for regulating the distance between the two parallel sides of the beam of light thus defined by the edge, 11, of the upper prism, and the edge, 16, of the lower prism.

The projecting lenses at 8 may be adjusted to project an image reduced to one-tenth of the width of the beam which enters this lens system, so that if the width of the area, 13, in the arrangement of Figure 1, be limited to about .01 inch, or the overlapping areas of the surfaces, 12 and 15, as shown in Figure 2, be substantially .01 inch, the focusing lenses, 8, will project upon the film at C a slit of light about .001 inch in width, and this may even be reduced to .0005 inch. The length of this slit for use in standard projecting machines is .080 inch.

While I have shown a pair of prisms as the preferred embodiment of my invention, it should be understood that a pair of opposed mirrors might be employed in substantially the same manner, being properly offset with respect to each other so as to limit the width of the beam of light as desired. It will also be understood that it is not essential that the prisms be cut with the particular angles shown in the drawing, though the shape illustrated is perhaps the most convenient. Various other changes in the construction and arrangement of the parts may be made without departing from the spirit and scope of my invention.

I claim:

1. Means for performing the function of an optical slit comprising a pair of triangular prisms mounted laterally adjacent, in combination with a source of light and a condenser lens directing said light onto an oblique surface of one of the prisms, the other prism having an oblique face which is parallel to that of the first prism and mounted opposite the same to receive the reflected light, and a focusing lens system through which the light is reflected from said second prism; the face of the first prism through which the light is reflected from said oblique surface of said prism being partially masked to limit the cross section of the reflected beam emerging therefrom.

2. Means for performing the function of an optical slit comprising a pair of triangular prisms mounted laterally adjacent, in combination with a source of light and a condenser lens directing said light in substantially parallel rays onto an oblique surface of one of the prisms, the other prism having an oblique face which is parallel to that of the first prism and mounted opposite the same to receive the reflected light, and a focusing lens system through which the light is reflected from said second prism, the side of the first prism opposite said oblique surface being masked from one edge to a line intermediate said edge and the opposite edge to limit the cross section of the reflected beam emerging therefrom, and the focusing lenses being adapted and adjusted to project a reduced image of the beam, having an area which is a fraction of the area of the beam transmitted from one prism to the other.

3. Means for performing the function of an optical slit comprising a pair of right triangular prisms disposed one above the other with their adjacent faces offset substantially in a common plane, one prism having another face disposed obliquely with respect to a beam of light, and the other prism having a corresponding oblique surface positioned to receive the reflection of said beam from the first prism, said reflection being defined and limited by the edge of the first prism, and means for defining an opposite edge of the reflection to limit the width of the beam reflected from the second prism.

4. Means for performing the function of an optical slit comprising a pair of triangular prisms mounted laterally adjacent each other, in combination with a source of light and a condenser lens for directing said light obliquely onto one surface of one of the prisms, the other prism having a face disposed oblique to the beam reflected from the first prism and adapted to reflect said beam, and a focusing lens system through which the reflection from the second prism is projected, the side of the first prism opposite its oblique surface being masked from one edge to a line parallel thereto to limit the cross section of the beam transmitted from one prism to the other.

JAMES J. MOREY.